Figure 1:
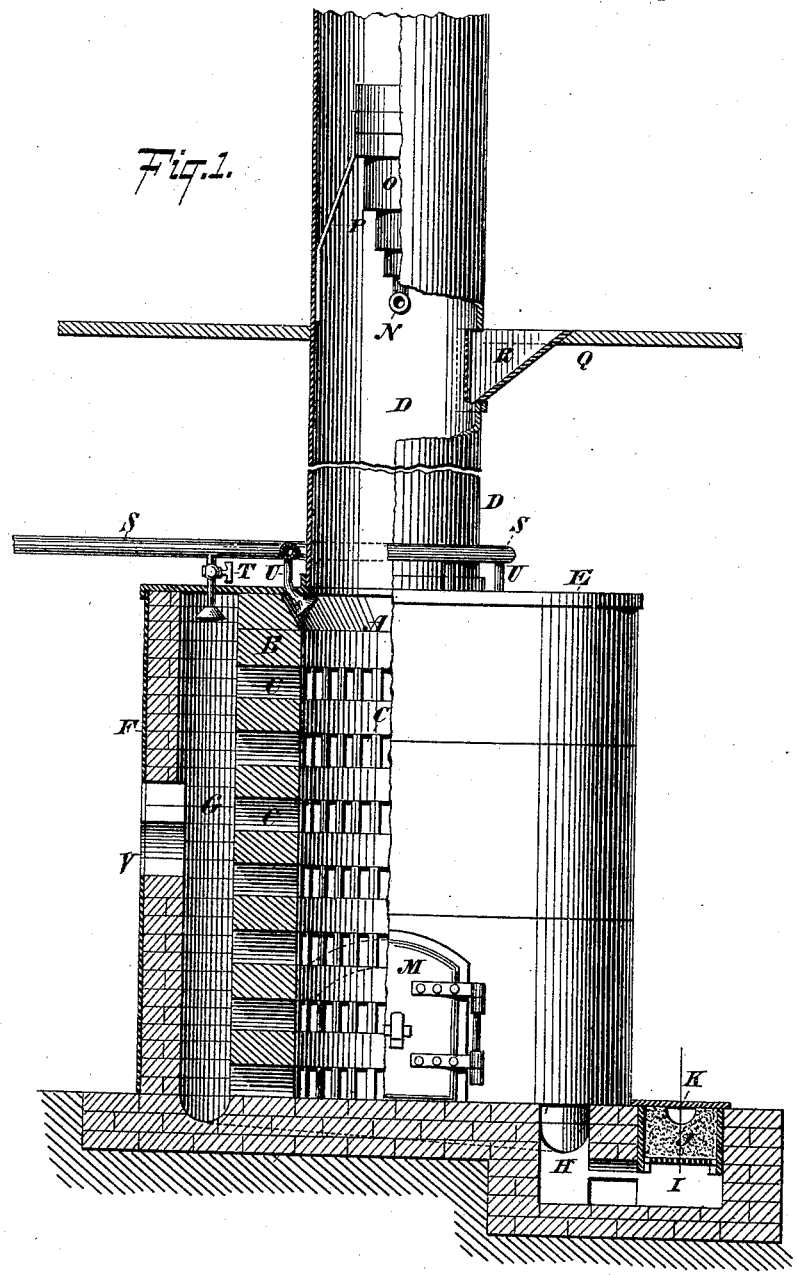

(No Model.) 2 Sheets—Sheet 1.

R. F. NENNINGER.
CONDENSER FOR FURNACE FUMES.

No. 426,465. Patented Apr. 29, 1890.

(No Model.) 2 Sheets—Sheet 2.
R. F. NENNINGER.
CONDENSER FOR FURNACE FUMES.
No. 426,465. Patented Apr. 29, 1890.
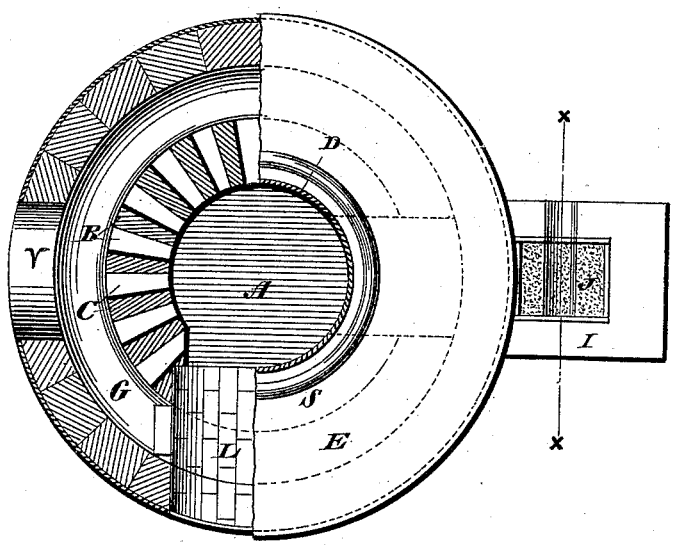
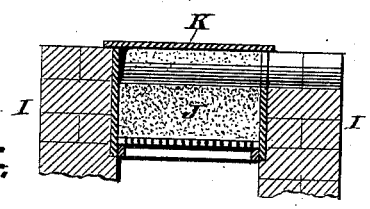
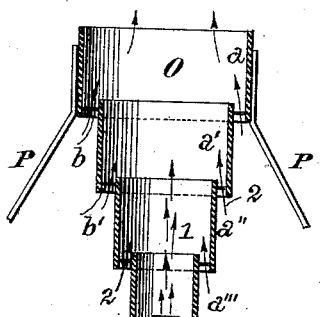
WITNESSES:
Gustave Dieterich
William Goebel.
INVENTOR
Robert F. Nenninger
BY Park Benjamin
his ATTORNEY.

UNITED STATES PATENT OFFICE.

ROBERT F. NENNINGER, OF NEWARK, NEW JERSEY.

CONDENSER FOR FURNACE-FUMES.

SPECIFICATION forming part of Letters Patent No. 426,465, dated April 29, 1890.

Application filed November 29, 1889. Serial No. 332,055. (No model.)

*To all whom it may concern:*

Be it known that I, ROBERT F. NENNINGER, of Newark, Essex county, New Jersey, have invented a new and useful Improvement in Condensers for Furnace-Fumes, &c., of which the following is a specification.

My invention relates to an apparatus for catching the dust and condensing the fumes coming from metallurgical furnaces; and it consists in the construction of said apparatus as hereinafter more particularly described.

In the accompanying drawings, Figure 1 is a side elevation and partial vertical section of my improved condenser, and Fig. 2 is a partial top view and horizontal section on the line $x\ x$ of Fig. 1. Fig. 3 is a vertical central sectional view of filter J on the line X X of Fig. 2. Fig. 4 is an axial sectional view of the exhauster O. Fig. 5 is a sectional view of one of the distributing-roses.

Similar letters of reference indicate like parts.

A is a shaft in the fire-brick wall B, in which are numerous openings C. At the upper portion of the shaft A is a wrought-iron stack D, which rests on the cover-plate E. Surrounding the wall B is a fire-brick wall F, so that between said walls F and B there is an annular chamber G. It will be observed that the plate E covers the top of the annular chamber G, and that the top of the shaft A just below the plate E is slightly flared or enlarged. The bottom of the annular chamber G forms a gutter, which is downwardly inclined to the point H, where it meets a cistern I. In said cistern is arranged a filter J, and above said filter and communicating therewith is a gutter K.

L is an arched passage through the walls F and B and chamber G, communicating with the interior of shaft A. This passage is closed by a door or doors M.

In the upper part of the stack D there enters a steam-pipe N, which communicates with an exhauster O in said stack, which exhauster is supported by brackets P. This exhauster is of well-known form, and its construction is shown in Fig. 4. It consists of a series of tubes $a\ a'\ a''\ a'''$ of varying diameters, connected together telescopically, the tube $a'$ being supported by an annular perforated plate $b$ in the bottom of tube $a$, the tube $a''$ by a similar plate $b'$ in the bottom of tube $a'$, and so on. Steam is admitted into the lowest tube $a'''$ through the pipe N, and rises up through the series of tubes, as indicated by the arrows 1, causing the entrainment of air through the perforated plates $b$ $b'$, &c., and hence producing an updraft in the stack D, in which the exhauster is supported by the brackets P. Its object and purpose when the steam is turned into it are to produce an upward draft in the stack, in a manner well known and not necessary to be described.

In the wall F there is an opening V, which communicates with the annular chamber G and with any source of fumes to be condensed, such as the flow of a reverberatory furnace. The stack D extends above the charging-floor Q, and in the side of said stack and having its mouth on a level with said floor Q is a charging-chute R. S is a pipe communicating with any suitable source of water-supply, and having depending from it numerous branch pipes T and U, which are provided at their lower ends with roses or sprinklers. The pipes U enter the flared space in the shaft A. The pipes T enter the annular chamber G.

The operation of the apparatus is as follows: The shaft A is filled with coke up to the level of the charging-floor. The fumes entering at the opening pass into the chamber G, and are met by a shower of water descending from the pipes T. This water takes up the dust in the fumes and washes the same into the gutter at the bottom of said chamber, the outflow going into the cistern I, then rising through the filter J, which prevents dust from passing, and running off into the gutter K. The dust is afterward removed through any convenient opening from the cistern I. The fumes thus freed from dust enter the stack A through the openings C, and are condensed in the coke therein, which is kept wet by the water percolating through said coke from the pipes U. Draft through the apparatus is produced by the exhauster O. The coke after use is removed from the shaft A through the door M.

I claim—

1. The combination of the shaft A, having lateral openings, the surrounding annular chamber G, having an inlet-opening in its outer wall for fumes to be condensed, and pipes communicating with a source of water-supply and with the upper portions of said shaft A and said chamber G, substantially as described.

2. The combination of the shaft A, having lateral openings C, the surrounding annular chamber G, having an opening in its outer wall for fumes to be condensed, and its bottom inclined to form a gutter H, and the water-pipes T U, communicating with said shaft and said chamber and with a source of water-supply, substantially as described.

3. The combination of the shaft A, having lateral openings C, a surrounding annular chamber G, having an opening in its wall for the fumes to be condensed, inclined gutter H in the bottom of said chamber G, the cistern I, and filter J, and water-pipes T U, entering said shaft A and chamber G, substantially as described.

4. The combination of the shaft A, having passage L at its lower portion, and having lateral openings C, the surrounding annular chamber G, having an opening in its wall for the fumes to be condensed, and a gutter at its bottom communicating with an outlet, and water-pipes communicating with said chamber G and shaft A and with a source of water-supply, substantially as described.

ROBERT F. NENNINGER.

Witnesses:
S. O. EDMONDS,
M. BOSCH.